(12) United States Patent
Lo

(10) Patent No.: US 9,551,986 B2
(45) Date of Patent: Jan. 24, 2017

(54) SCADA SYSTEM REAL-TIME DATA AND EVENT MANAGEMENT ON A PC CARD

(71) Applicant: Siemens Aktiengesellschaft, Munich (DE)

(72) Inventor: George Lo, Plainsboro, NJ (US)

(73) Assignee: Siemens Aktiengesellschaft, Munich (DE)

(*) Notice: Subject to any disclaimer, the term of this patent is extended or adjusted under 35 U.S.C. 154(b) by 566 days.

(21) Appl. No.: 13/633,993

(22) Filed: Oct. 3, 2012

(65) Prior Publication Data

US 2013/0144405 A1 Jun. 6, 2013

Related U.S. Application Data

(60) Provisional application No. 61/567,263, filed on Dec. 6, 2011.

(51) Int. Cl.
*G05B 19/18* (2006.01)
*G05B 19/418* (2006.01)

(52) U.S. Cl.
CPC . *G05B 19/4183* (2013.01); *G05B 2219/32404* (2013.01)

(58) Field of Classification Search
USPC .......................................................... 700/2, 9
See application file for complete search history.

(56) References Cited

U.S. PATENT DOCUMENTS

| 7,130,760 B2 * | 10/2006 | Ilic ................................ 702/176 |
| 2005/0132064 A1 | 6/2005 | Lo |
| 2009/0276060 A1 | 11/2009 | Lu et al. |
| 2010/0222896 A1 | 9/2010 | Braun et al. |

* cited by examiner

*Primary Examiner* — Carlos Ortiz Rodriguez

(57) ABSTRACT

Real-time data and event management (RDEM) is implemented on a separate component in supervisory control and data acquisition (SCADA). To assist in upgrades or changes to the SCADA system without compromising RDEM, the RDEM function is performed on a separate card or physical component. When the computer running the SCADA system is upgraded, the RDEM on the separate card and corresponding persistence store is maintained.

21 Claims, 3 Drawing Sheets

US 9,551,986 B2

SCADA SYSTEM REAL-TIME DATA AND EVENT MANAGEMENT ON A PC CARD

RELATED APPLICATIONS

The present patent document claims the benefit of the filing date under 35 U.S.C. §119(e) of Provisional U.S. Patent Application Ser. No. 61/567,263, filed Dec. 6, 2011, which is hereby incorporated by reference.

BACKGROUND

The present embodiments relate to real-time data and/or event management (RDEM) in a supervisory control and data acquisition (SCADA) system.

SCADA systems implement industrial processes or industrial control systems. For example, a SCADA system may monitor and control a manufacturing process using communications with sensors, actuators, and field devices (e.g., programmable logic controllers or remote terminal units). The SCADA system provides control capabilities and a user interface for interacting with the control and data acquisition of the process.

Various applications are performed by the SCADA system. A configuration application may be operated as a tool to tag or otherwise label field devices included in the controlled process. Business object applications may monitor progress of a part being manufactured or process being performed. Other application clients may include visualization applications, workflow monitoring, reporting, or communications applications.

The application clients rely on data from the field devices. Rather than requiring calls from different applications to the same field devices, the SCADA system implements real-time data and event management (RDEM). The RDEM implements a memory resident process image in which the states of the objects representing the physical process are kept valid and current in memory. When a change occurs, the change is received by field device gateways and routed to the RDEM for update. The application clients access the RDEM rather than performing calls to the field devices, allowing faster response and less communication load on the field devices. Critical process states which cannot be recovered following a system restart, so called retentive states, are also written to the persistence store during run-time. The RDEM may be configured by a configuration application. When the configuration is modified, the RDEM may write the new configuration to the persistence store.

The performance and reliability requirements of the RDEM make the RDEM one of the most complicated and costly components to develop and test in a SCADA system. Any change in the SCADA system requires extensive testing to make sure RDEM operates without loss of needed data. This often becomes the blocking point in bringing the SCADA system onto a new technology platform. If a new operating system or computing platform is available, the SCADA system is less likely to be upgraded due to the testing requirements.

BRIEF SUMMARY

By way of introduction, the preferred embodiments described below include a method, system, instructions, and computer readable media for real-time data and event management (RDEM) in supervisory control and data acquisition (SCADA). To assist in upgrades or changes to the SCADA system without compromising RDEM, the RDEM function is performed on a separate card or physical component. When the computer running the SCADA system is upgraded, the separate RDEM and corresponding persistence store is maintained.

In a first aspect, a system is provided for real-time data and event management (RDEM) in supervisory control and data acquisition (SCADA). A SCADA device provides industrial control using actuators and based on input from sensors. The SCADA device including a first processor and a first card connector. A computer card has a memory, a second processor, and a persistence store. The computer card is operable to connect with the first card connector and configured to implement the RDEM for SCADA with communications with the first processor through the first card connector. The memory of the computer card is configured to store state information of the sensors and the actuators.

In a second aspect, a method is provided for event management in a supervisory control and data acquisition (SCADA) system. A change in state is received from a field device. The state is updated in a persistence store in response to receiving the change. The persistence store, and a first processor for managing the a process image are a first component. A second processor runs a SCADA application. The second processor is a second component where the first component is on a separate circuit board than the second component. The SCADA application operates as a function of the state of the field device. The SCADA application accesses the state of the process image.

In a third aspect, a method is provided for event management in a supervisory control and data acquisition (SCADA) system. A user interface of the SCADA system is generated with a computer and operating system. A real-time data and event management system is maintained on a computer card disconnectable from the computer. The computer, the operating system, or the computer and the operating system are changed to another computer, another operating system or the other computer and the other operating system while separately maintaining the real-time data and event management system on the computer card. The computer card is operable with the computer, the operating system, the other computer, and the other operating system.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In one embodiment, RDEM is implemented on a PC-card rather than by the general processor running the application clients of the REDM. In place of the RDEM on the personal or other computer, a gateway acting as a delegate to the RDEM handles client accesses to the RDEM on the PC-card. The RDEM gateway is also responsible for subscribing to the field device gateways for process events (e.g. change of states).

Implementing the RDEM of a SCADA system on a PC-card may increase the availability and robustness of the system since the system may recover more quickly following a crash of the PC. Implementing the RDEM of a SCADA system on a PC-card may allow for easier upgrade to new PC platforms since the RDEM, which is usually the most difficult and costly part of the system to develop and test, is not impacted.

Figure 1:
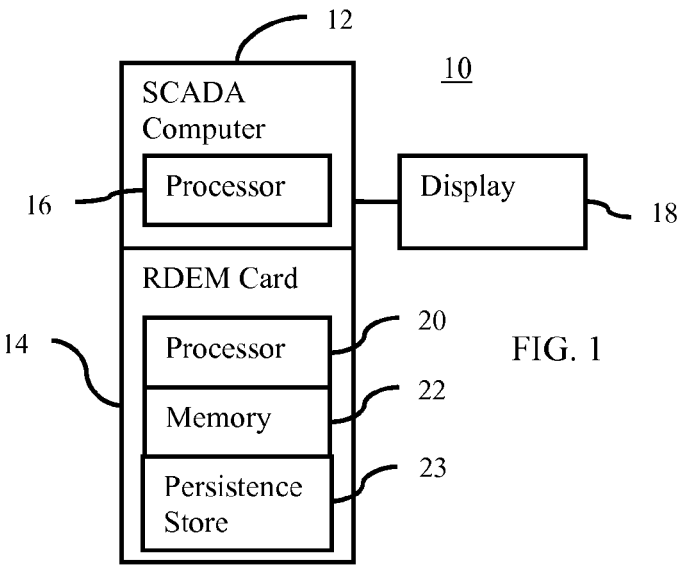
FIG. 1 is a block diagram of one embodiment of a SCADA system with RDEM on a separate card.

FIG. 1 shows a system 10 for real-time data and event management (RDEM) in supervisory control and data acquisition (SCADA). The system 10 includes a SCADA computer 12, a RDEM card 14, and a display 18. Additional, different, or fewer components may be provided. For example, the system 10 includes a user input, such as a keyboard. As another example, a communications network, communications interface, and field devices connect with the system 10. In one embodiment, the system 10 is a centralized system for industrial process control. For example, the system 10 is a desktop, station, or panel mounted computer for controlling and/or monitoring work flow, manufacture, processing, or other electronically controlled arrangements.

Figure 2:
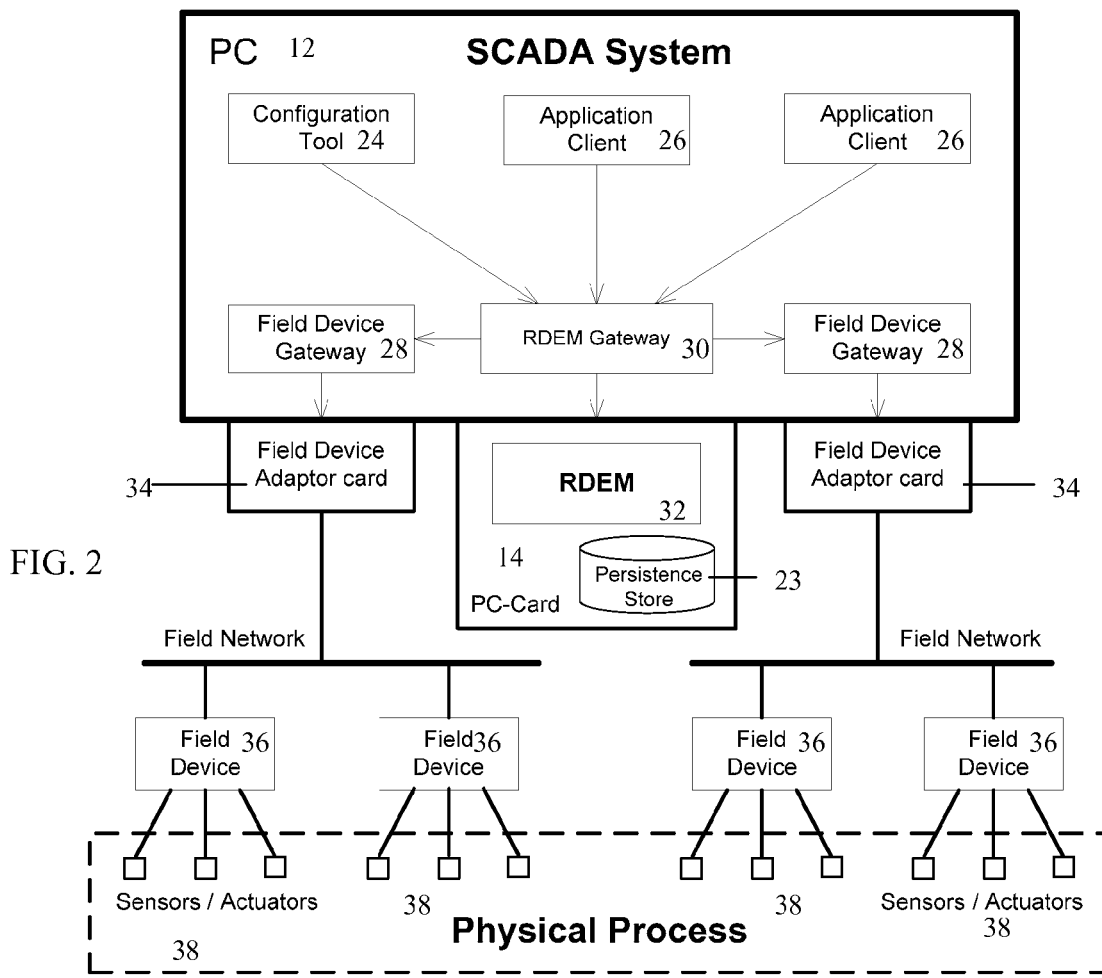
FIG. 2 illustrates RDEM on a card separate from the SCADA system in an embodiment with field device communications through the SCADA computer.
Figure 3:
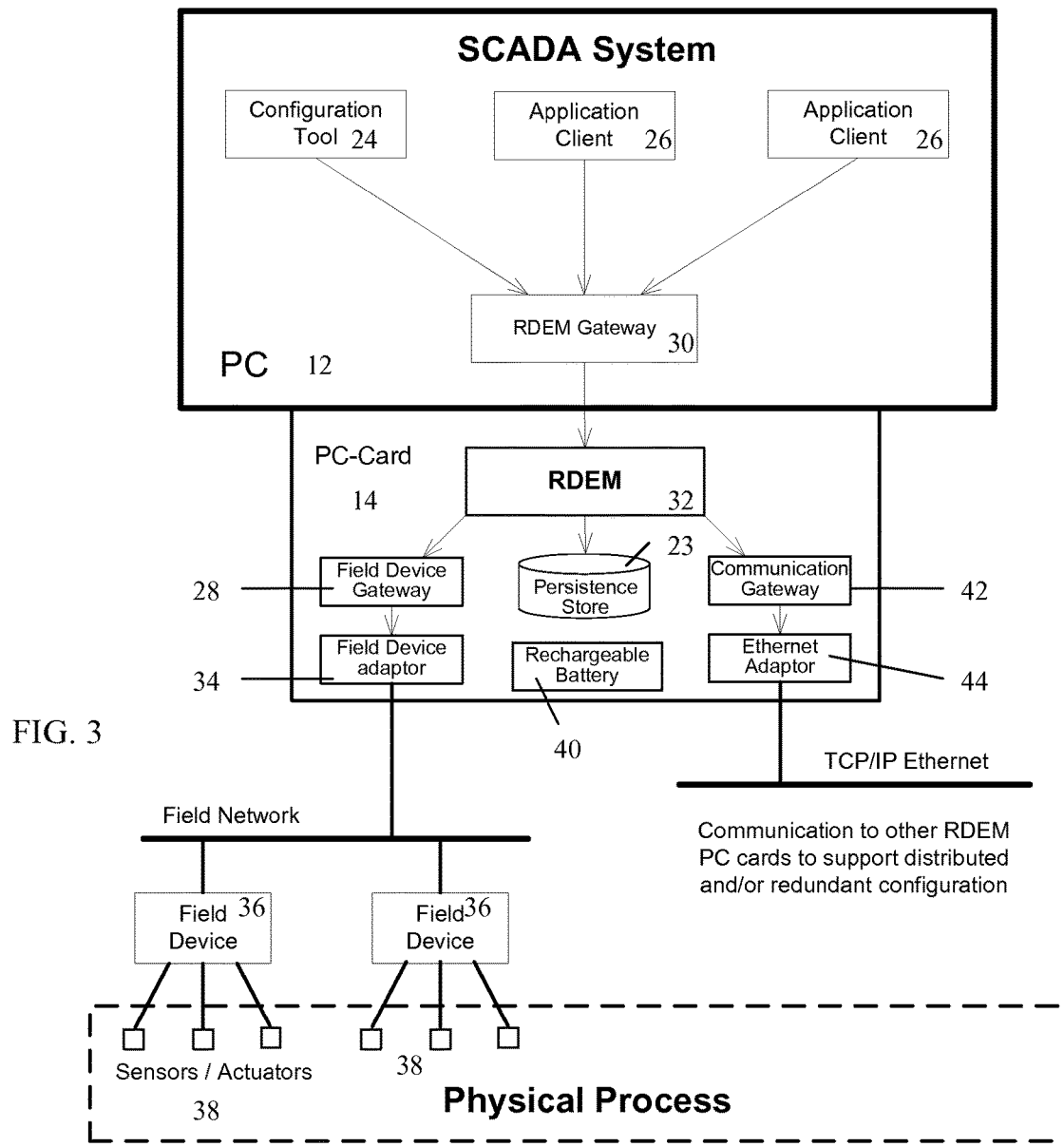
FIG. 3 illustrates RDEM on a card separate from the SCADA computer in an embodiment with field device communications through the card.

FIGS. 2 and 3 show different embodiments of the system 10 of FIG. 1 as connected with field devices 36 and sensors and actuators 38 of a physical process. In FIGS. 2 and 3, the SCADA computer 12 is a personal computer and the RDEM card 14 is a PC-Card. Rather than show the processor 16 in FIGS. 2 and 3, the functions, engines, or algorithms implemented by the processor 16 are shown as the configuration tool 24, application clients 26, and gateways 28, 30. Similarly, the RDEM function, engine, or algorithm implemented by the processor 20 of the RDEM card 14 is shown instead of the processor 20.

The field devices 36 are panels, programmable logic controllers, and/or remote terminal units. Other SCADAs, controllers, monitors, or devices for monitoring physical processes or characteristics and controlling manufacturing or production may be used.

The sensors 38 and actuators 38 are part of or separate from the field devices 36. The sensors 38 may be temperature, pressure, rate, current, voltage, inductance, capacitance, chemical, flow, or other sensors. Any number of sensors may be used. The actuators 38 may be magnetic, electric, pneumatic, or other devices for altering, moving, drilling, welding, mixing, spinning, changing or otherwise actuating. The sensors 38 and actuators 38 may or may not include processors or circuits for calculating values. The sensors 38 and actuators 38 communicate with or are part of the field devices 36 for control and measuring. The field devices 36 communicate with the system 10 to record events and data, such as associated with a state of an actuator or sensor (e.g., actuator "on" or "off" and temperature at 211 degrees).

A field network interconnects the field devices 36 with the system 10. The field network may be wired and/or wireless. Any communications format may be used. In one embodiment represented by FIG. 3, a separate computer network, such as a TCP/IP Ethernet is provided for communication between control devices, such as back-up storage, other SCADA computers 12, other RDEM cards, or monitoring processes.

The SCADA computer 12 is a SCADA device for industrial control using the actuators and based on input from the sensors. The SCADA computer 12 is a personal computer, laptop, tablet, server, controller, processor, network router, field device adaptors (e.g. PROFINET), or other station for running applications for control, monitoring, reporting, and/or configuring an industrial process. In FIGS. 1-3, a single SCADA computer 12 is provided. In other embodiments, the SCADA computer 12 is part of or represents a distributed control arrangement of a plurality of devices.

In one embodiment, the SCADA computer 12 is a publicly available computer platform, such as an Apple or IBM compatible computer. In other embodiments, the SCADA computer 12 is a custom created device. The SCADA computer 12 operates pursuant to an operating system. The operating system is publicly available, such as a Windows operating system. The operating system controls the user interface of the SCADA computer 12. Alternatively, the SCADA computer 12 operates pursuant to custom programmed routines or operating system.

Referring to FIG. 1, the SCADA computer 12 includes a processor 16. The processor 16 is one or more general processors, digital signal processors, application specific integrated circuits, field programmable gate arrays, controllers, analog circuits, digital circuits, server, graphics processing units, graphics processors, combinations thereof, network, or other logic devices. A single device is used, but parallel or sequential distributed processing may be used. The processor 16 is configured by hardware and/or software to perform the various acts discussed herein.

The SCADA computer 12 includes a memory. The memory is a non-transitory computer readable storage medium with processing instructions. Data representing instructions executable by the programmed processor 16 is provided. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 16 and memory are mounted to or connected with a motherboard. The motherboard is a circuit board including the processor 16 and slots with RAM. Connectors for other components, such as for a hard drive, are provided on the circuit board. The motherboard also includes connectors for separate circuit boards or cards. The connectors may be slotted connectors, such as for bus-based communications. In one embodiment, a slot connector for a peripheral component interconnect (PCI) is used. The slot connector is mounted to the circuit board. In other embodiments, universal serial buss (USB), Ethernet, SATA, or other connectors are used for connecting other components to the motherboard. Combinations of different connectors may be used.

One of the connectors is used to releasably connect with the RDEM card 14. For example, a PCI connector includes one or more levers for physically mating with the RDEM card 14 when the RDEM card 14 is inserted into a slot of the connector. The levers may be moved to release the RDEM card 14. As another example, a USB or other connector is provided for plugging in a cable from the RDEM card 14.

Communications connectors or adaptor cards 34 for field devices 36, sensors, and/or actuators 38 may be included in the SCADA computer 12 or on the motherboard. For example, a PCI or other connector in the SCADA computer 12 is used for connecting an adaptor card 34 with one or more connectors. The adaptor card 34 includes field device connectors, such as RJ11, Ethernet, serial, wireless or others, for communications with the field devices 36. In alternative embodiments, the motherboard of the SCADA computer 12 includes connectors used to connect with the field devices 36 without an adaptor card.

The processor 16 of the SCADA computer 12 is configured to run the applications 24, 26. For example, the processor 16 runs a thread for the configuration tool 24. The configuration tool 24 defines which field devices 36, sensors 38, and/or actuators 38 are controlled by the SCADA system 10 and/or used by applications implemented by the processor 16. The field devices 36, sensors 38, and/or actuators 38 are tagged or labeled by the configuration tool 24, indicating which devices are managed so that subsets may be assigned to different processes.

The processor 16 of the SCADA computer 12 is configured to run other application clients, such as a user interface client and a client for processing of a business object. These clients are of the RDEM card 14. The user interface client, using the operating system, generates input and output information for a human-machine interface. For example, a graphic representation of field devices 36, sensors 38, or actuators 38 and corresponding states is generated with locations identified for user input of configuration or control information. Other visualization or reporting client applications may be used. As another example, an application for eliciting, receiving, and/or generating control settings and instructions is run as a thread by the processor 16.

The processor 16 is configured to generate a RDEM gateway 30. The RDEM gateway 30 adapts communications from other devices into a format for the RDEM 32 and adapts communication from the RDEM 32 to the other devices into a format for the other devices. The RDEM gateway 30 is a software interface or driver for communications to and from the RDEM 32. Hardware interfacing may be provided. In alternative embodiments, the RDEM card 14 generates an interface to implement the RDEM gateway 30.

The processor 16 may be configured to generate one or more field device gateways 28. The field device gateways 28 are interfaces for conforming the format of data to and from the field devices 36. The interface is a driver or software for establishing communications, such as for PROFINET support. In alternative embodiments, the field device gateways 28 are implemented by the field device adaptor cards 34 and/or the field devices 36.

The display 24 of the SCADA computer 12 is a CRT, LCD, projector, plasma, printer, panel, or other display for displaying output of application clients 24, 26. For example, an image representing a workflow or processing stage is generated and displayed. As another example, measurements and actuator states for a process are displayed graphically or in a table.

The RDEM card 14 is a computer card. The computer card is a circuit board. The RDEM card 14 is on a separate circuit board than the processor 16 of the SCADA computer. The separate circuit board is not integrated with the motherboard, other than the releasable connector and/or other mounting for separate components. The material of the board is not integrated with the motherboard, but is independent.

The RDEM card 14 includes one or more connectors for connecting with the mother board of the SCADA computer 12. For example, the RDEM card 14 includes contact pads on an extension of the board for fitting into a slotted PCI connector on a mother board. As another example, the RDEM card 14 includes prongs, receptacles, or other mating devices for electrical and/or physical connection. The RDEM card 14 supports a parallel interface, such as a dual-ported RAM, for communication with the SCADA computer 12 (e.g., the host PC). Other formats for the interface may be used. In another example, the RDEM card 14 includes a connector and cord for remote connection with the SCADA computer 12, such as the RDEM card 14 being in a separate housing and having a cord for plugging into a connector of the SCADA computer 12.

The RDEM card 14 is releasably connectable with the connector of the SCADA computer 12. For example, a plug, latch, screw, friction fit, or combinations thereof are used to hold the RDEM card 14 or plug from the RDEM card 14 in a connector on, extension from, or connected with the motherboard.

By providing the RDEM 32 on a separate RDEM card 14 than the SCADA computer 12 or than the motherboard, changes to the SCADA computer 12 may be made without altering the RDEM 32. The SCADA device is changeable while maintaining the RDEM card 14 and corresponding RDEM 32. The RDEM function is not changed, so less testing may be needed for upgrade of the SCADA system 10. The SCADA computer 12 may be upgraded to a new platform, operating system, or other change without alteration of the RDEM 32 and without corresponding testing. Since the RDEM card 14 is separate from the operating system and human-machine interface of the SCADA device, upgrades or changes may be more easily performed. The RDEM 32 operates on the RDEM card 14, so the same RDEM card 14 may be ported to and used with upgraded platform and/or operating system. The RDEM gateway 30 addresses any change in communications due to a new operating system. The RDEM software and the RDEM card hardware may be used with different SCADA computers 12.

The RDEM card 12 includes the processor 20, the memory 22, and a persistence store 23. The memory 22 and persistence store 23 are the same or different type of memory and storage as used in the SCADA computer 12. For example, the memory 22 is dynamic RAM used as main memory in a computer, and the persistence store 23 is a non-mechanical hard drive, such as SRAM, flash drive, or solid state drive (SSD). The memory 22 is configured to store state information for the sensors 38 and actuators 38. The persistence store 23 is configured to store retentive states as well as the configuration information and executable code of the RDEM 32. Events or other data communicated from the field devices 36 and/or the applications 24, 26 are stored for access by the applications 24, 26.

The processor 20 is the same or different type of as the processor 16 of the SCADA computer. For example, the processor 20 is a field programmable gate array, application specific integrated circuit, or control processor for implementing RDEM in conjunction with the memory 22.

As shown in FIG. 3, the RDEM card 14 may include a battery 40. The battery 40 is rechargeable, but may not be in other embodiments. The battery 40 is sufficient to maintain the persistence store 23. Alternatively or additionally, the battery 40 is sufficient to maintain operation of the processor 20, the memory 22, the persistence store 23, and any interfaces, such as the adaptors 34 for communicating with field devices 36. The battery 40 allows operation of the RDEM card 14 and corresponding RDEM 32 while disconnected or while not powered by the SCADA computer 12, such as during an upgrade, change, or power loss to the SCADA computer 12. In other embodiments, the RDEM card 14 includes a cord for connection to a power source other than the SCADA computer 12. Alternatively, no separate power source is provided.

The processor 20 is configured to implement RDEM 32. The RDEM 32 is used in SCADA to improve response time and avoid multiple calls to the same field device 36 for the same information. The processor 16 of the SCADA computer 12 requests or accesses data or event information from the RDEM 32 rather than the field devices 36.

A process image is maintained as part of RDEM for access by applications 24, 26 run by processor 16 of the SCADA computer 12. The process image has the state of various actuators (e.g., position, level, or other indication), state of various sensors (e.g., temperature, pressure, or other measures), calculated information (e.g., point of workflow, average pressure, or other derived values), or other data and/or event information. Client applications may calculate values based on historical and/or current information used in the control process. These values are stored as part of the process image in memory and, if needed, also in the persistence store of the RDEM 32. Because the main memory 22 keeps the data of software while the software is running (e.g., the data of the software may be lost when the software stops running due, for instance, to crash of the software of the computer), states that cannot be retrieved from the field device following restart of RDEM 32 are stored in the persistent store 23. Specific data in the process image is written to the persistence store 23 whenever there is a change. It is not necessary to store the entire process image in the persistence store 23. The executable code of RDEM 32 is also on the persistent medium on the PC card 14 in order to boot up an run. Configuration information of RDEM 32 and the process image (e.g., which sensor is connected to which field device and what is its tag name) is also stored in the persistence store 23.

The field devices 36, actuators 38, and/or sensors 38 communicate the current state and the RDEM maintains the current state with or without a history of states over time. The field devices 36, actuators 38, and/or sensors 38 may communicate periodically regardless of change or only communicate when a threshold amount of change occurs. Alternatively, the RDEM 32 or gateway 28, 30 may filter the data to identify changes. The RDEM 32 updates the process image based on any changes of state. The states are maintained until a change is detected. Once a change occurs, the appropriate state or states are updated.

Any now known or later developed RDEM 32 may be used. In one embodiment, the RDEM 32 formats the data and/or events as chained lists of process variables. In another embodiment, the RDEM 32 formats the data and/or events as model driven object-oriented repositories. The RDEM 32 uses unmanaged code (e.g. C or C++) and low-level system functions. In alternative embodiments, managed code (e.g., Java) and/or any system level functions are used.

The RDEM 32 is installed using communications from the processor 16 of the SCADA computer 12, through the connectors between the SCADA computer 12 and the RDEM card 14, and to the persistence store 23 of the card 14 through the processor 20 of the card 14. The communications may alternatively be through access to the persistence store 23 without the processor 20.

For collecting the process image, the communications to and from the field devices 36 route through the adaptors 34 and gateways 28. In the example of FIG. 2, the communications are received by the SCADA computer 12 and sent to the RDEM card 14 through the RDEM gateway 30. In the example of FIG. 3, the communications are received by the RDEM card 14, so the RDEM gateway 30 is not used for field device communications. The processor 20 generates the gateways 28 used for communications. By providing adaptors 34 (e.g., connectors) on the RDEM card 14, the RDEM may continue to operate on independent power (e.g., battery) as normal during a time in which the SCADA computer 12 is down or unavailable. This may be useful to avoid process slow downs or halting and/or for continued operation in a distributed SCADA configuration, such as allowing other SCADA computers access to the process image despite one SCADA computer 12 being unavailable.

Maintaining the RDEM 32 on a separate card 14 from or of the SCADA computer 12 may provide increased availability. If an application client or a device gateway crashes, the SCADA system 10 is not entirely unavailable. Implementing the RDEM 32 on the RDEM card 14 may be more robust than implementing by the processor 16 on the SCADA computer 12 because the operating environment of a purpose built card may be a lot less complex than that of a general computer.

In the case of where the RDEM card 14 has a backup power system (e.g. rechargeable battery 40) and the adaptors 34 for communication to field devices 36, no process event is lost during the time the SCADA computer 12 is unavailable. Moreover, in the case where the RDEM card 14 also has the network adaptor 44 for communication to the other RDEM cards 14, the data from the RDEM 32 of the crashed SCADA computer 12 continues to be available uninterrupted to the other SCADA computers 12 in the distributed configuration.

Implementing the RDEM 32 on a RDEM card 14 separable from the SCADA computer 12 may allow for faster system restart following a crash. As long as there is no power loss or is sufficient battery life, the RDEM 32 on the RDEM card 14 is not impacted when the SCADA computer 12 crashes. This allows faster restart of the system since the RDEM 32 need not be reloaded from the persistence store. In the case where the RDEM card 14 also implements the communication to the field devices 36, there is no need to synchronize the RDEM 32 with the field devices 36 after the SCADA computer 12 recovers from a crash since the RDEM 32 is kept current. The RDEM card 14 maintains the connection, avoiding reestablishing communications links, avoiding updating the process image with any missed state changes, and avoiding any downloads needed to operate.

Implementing the RDEM 32 on a RDEM card 14 separable from the SCADA computer 12 may allow for a shorter innovation cycle. SCADA computers 12 may be implemented on commercial, off-the-shelf (COTS) platforms to reduce development costs on the one hand and, on the other hand, to benefit from the rapid innovation of COTS technologies. With the RDEM 32 on the separate RDEM card 14, a SCADA station may be changed to a new COTS platform without the need to also port the RDEM 32. The RDEM 32 may be already tested or field proven, such that the upgraded SCADA computer 12 may benefit by using the proven RDEM 32 despite any upgrade. Where RDEM 32 is implemented by the processor 16, an upgrade of the SCADA computer 12 would require porting of the RDEM 32, which does not bring new benefits as application clients 24, 26 would do.

Figure 4:
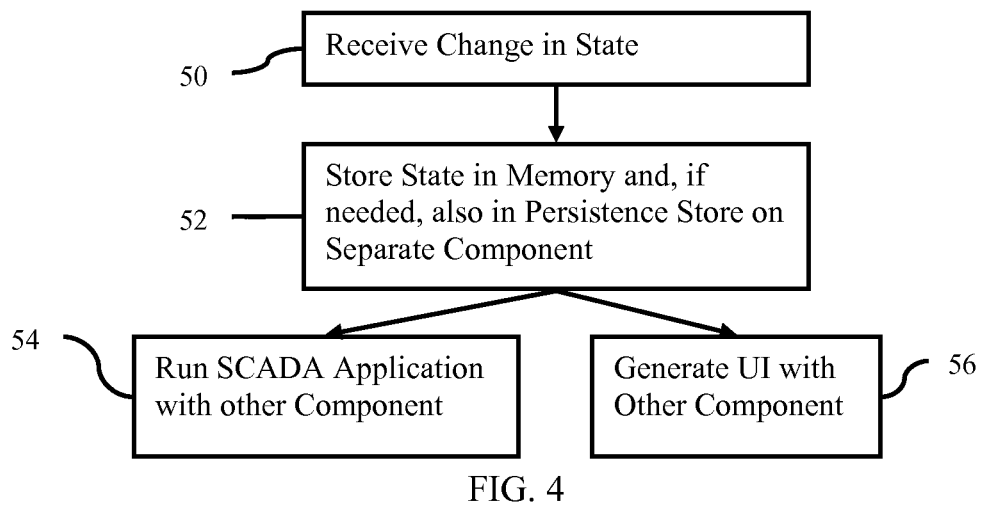
FIG. 4 is a flow chart diagram of one embodiment of a method for event management in a SCADA system.
Figure 5:
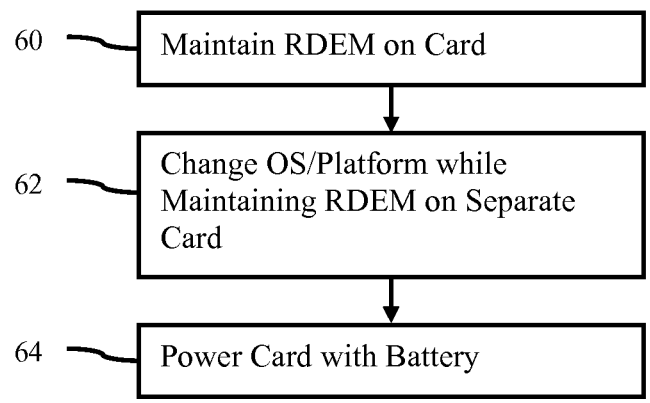
FIG. 5 is a flow chart diagram of one embodiment of a method for even management in a SCADA system with an upgrade.

FIG. 4 shows a method for event management in a supervisory control and data acquisition (SCADA) system. Operation of RDEM on a component separate from the motherboard or separable from the SCADA station is shown. Additional, different, or fewer acts may be performed. For example, acts 50 and/or 52 are not performed where no change in state occurs. As another example, act 56 is not performed. In yet another example, the acts of FIG. 5 are performed.

The acts of FIG. 4 are implemented by the system 10 of FIG. 1, the systems of FIG. 2 or 3, or a different system. The acts are performed in the order shown or a different order.

In act 50, a change in state is received from a field device. After establishing communications and loading application clients and gateways, the RDEM begins operations. To maintain the process image, the state of various field devices, sensors, actuators, business objects, client application processes, values, or other information is collected. This data represents a current and/or past image of the controlled process.

Rather than continually rewrite each variable in the process image, the variables associated with a change are updated. When a change in state is received, the value for the state is updated. The change may be indicated by the field device or identified by the RDEM. The change may be any change or a threshold change. For example, the state of a temperature from a sensor may be 100 degrees. If the state changes to 101 degrees, the change is not identified or is ignored. If the state changes by the threshold amount (e.g., by 3 degrees), then the state change results in alteration of the process image for the sensor.

The state change is received through a communications network. The SCADA component may receive the state change on an interface for communications with field devices. Alternatively, the state change is received on an interface for the separate RDEM component, skipping or not relying on the SCADA component for communication with the field device. The gateway for interfacing communications and corresponding physical adaptors or connectors are in the SCADA component, the separate RDEM component, or both.

The field device receives state information from sensors. The state of a controlled actuator may be known to the field device or received from a sensor. The field device routes the state information from the sensors and/or actuators to the SCADA system. The field device may implement filtering to only output sufficient changes in state. Alternatively, periodic or constant output of the current state is provided regardless of change.

In act 52, the state is stored in memory. In the case of a retentive state, the state is also stored in a persistence store. The persistence store maintains information despite power loss. The persistence store is part of the RDEM component, but may be remote from the processor implementing RDEM.

A processor manages the data and events. The process image is maintained in the memory by the processor. The processor and the memory or just the processor are provided as a component. The component has its own circuit board and releasable connector. In other embodiments, the component has a housing. The circuit board and/or housing of the component for implementing RDEM are separate from the component for operating a user interface and/or application clients. The component for RDEM implements just RDEM functions, but may implement other functions, such as one or more application clients.

As changes are received, the state for the each change is updated. The process image of the states for controlled components and business objects (e.g., part being assembled or workflow) is maintained. Where no change occurs for a given variable, the current state is reflected by the value of the last update. Where change occurs, the update is performed to reflect the current value. The retentive states in the process image are persistently stored, providing data and event availability for applications. The process image is updated in real-time with any changes. As the changes occur (e.g., within seconds), the process image is updated.

Changes may be communicated from the SCADA component implementing the application clients. A management gateway is run by a processor or interface of the SCADA component for formatting and routing the changes in state to the RDEM component. The processor of the RDEM component routes the change to the persistence store if the change is retentive. The process image is updated by changing the value of the corresponding variable. In other embodiments, the changes are communicated from the field device without routing through the SCADA component. The SCADA component implements the management gateway for access to the process image by application clients of the SCADA component.

In act 54, one or more SCADA applications are run. The SCADA applications are for control of the industrial process, configuration, visualization, and/or reporting. More than one SCADA application may be run. For example, one application is provided for configuring the process and/or field devices to be used. Another application is provided for implementing the process or controlling the field devices. Yet another application is provided for generating a visualization of the process, state of the process, and/or state of the business object or objects. Another application is provided for reporting. The applications in the above example may be combined or further separated. Other applications may be provided, such as the same applications being provided for other processes controlled by the SCADA component.

One or more of the SCADA applications operate as a function of the state of one or more field devices, such as sensors or actuators. For example, the control application generates instructions for actuation based on the current state and/or trend in state of one or more sensors. As another example, visualization and/or reporting applications use the state information for presentation.

To use the state information, the SCADA application accesses the state from the process image. The process image is used to provide the desired information. The processor implementing the SCADA application requests the state from the processor and/or memory implementing the RDEM. The request may be routed through a management gateway from the SCADA application to the RDEM. In response, the processor and/or memory implementing RDEM replies with the requested information. Since separate components are used, the request and reply are transmitted through one or more connectors, such as a PCI slotted connector.

One or more SCADA applications may contribute to the process image. Values or other information is calculated or created by the application. For example, a running average is calculated by calls to the RDEM for state at different times. The running average is communicated to the RDEM for storage in the process image and, if appropriate, in the persistence store. The process image includes the running average or other values determined by the application. The application or another application may access the process image to acquire the information contributed by the application.

The SCADA application is run by a processor of another component than used for running RDEM. The processor is on a different circuit board and/or in a different housing than the component used to maintain the process image. Separate circuit boards and/or memories are provided for the SCADA application than for the RDEM. For example, the SCADA application is run as a thread or threads of a computer processor. The RDEM is run on a card removeably mounted in or to the computer. The SCADA application is implemented with a program for operation on an operating system of a COTS platform. The RDEM is implemented on a dedicated card without a general purpose operating system. A proprietary or RDEM specific operating system may be provided. Alternatively, the RDEM is implemented on an ASIC without an operating system.

In act 56, a user interface is generated. The user interface is used for configuration, reporting, monitoring, or other human-machine interaction with the SCADA system. The user interface includes one or more displayed images. Software generated buttons and/or hardware-based input devices may be used. The user interface includes control of or drivers for the user input device and the output display.

The user interface is generated by the SCADA component implementing one or more applications. The applications may access the user interface. The SCADA component may use an operating system to generate and/or operate the user interface. For example, a computer with a Windows or other operating system generates the user interface and is the SCADA component.

By using a separate component to run the RDEM from the component used to run one or more SCADA applications, the RDEM may be maintained separately. As the SCADA component is updated or changed, the RDEM may avoid change. This may reduce testing requirements and more likely allow for faster innovation and upgrading of the SCADA system.

FIG. 5 shows a method for upgrading a supervisory control and data acquisition (SCADA) system. The RDEM is provided in such a way that the SCADA component may be more easily changed. Additional, different, or fewer acts may be performed. For example, act 64 is not provided. As another example, the acts of FIG. 4 are performed.

The acts of FIG. 5 are implemented by the system 10 of FIG. 1, the systems of FIG. 2 or 3, or a different system. The acts are performed in the order shown or a different order.

In act 60, a real-time data and event management system is maintained on a computer card or RDEM component removable from a SCADA component. The card is removable by releasing latches, removing a screw, unplugging a connector, and/or other disconnection. By being a separable component, the RDEM component may be reused in different SCADA components. The RDEM function may remain the same while the SCADA component is altered. The card may be within the SCADA component, but is outside the SCADA component (e.g., separately housed, stand along component) in other embodiments.

The process image is created and managed by the RDEM component. For example, the process image is maintained as discussed above for acts 50 and 52 of FIG. 4. Other approaches for implementing RDEM on the separate card or component may be used.

In act 62, the operating system, the platform, hardware, other software, or combinations thereof of the SCADA component is changed. For example, a new application client is added or an application client is replaced. As another example, the operating system is upgraded or changed. In yet another example, a new processor and/or new platform (e.g., new computer) replaces the old SCADA component or processor. The SCADA component, software, or part is changed to a new SCADA component, software or part.

The change in the SCADA component is performed while maintaining the RDEM component. The RDEM component is self contained, communicating in a given format without reliance on the hardware of the SCADA component. As long as the SCADA component includes an interface, the same RDEM component may be used with different SCADA components. For example, the RDEM card is removed from a SCADA computer. The RDEM card is installed (e.g., placed in a slot and connected) in a new SCADA computer with the same or different operating system and/or application clients. If the new SCADA component has a different operating system or processor type, then the RDEM gateway may need to be ported or at least recompiled. The RDEM card operates with the new SCADA computer. As another example, the application client or other software of the SCADA computer is changed. The persistent store of the RDEM is maintained despite the change. Even if the memory of the SCADA component is changed, the persistent store is available.

Changing the RDEM software may be costly due to testing. To avoid changing the RDEM software while still taking advantage of new computing platforms and software, the RDEM function is implemented on the separate component. The SCADA system may be upgraded without changing the RDEM.

In act 64, the RDEM component is powered separately from the SCADA component. For example, the RDEM component includes a battery back-up or a battery power source for on-going or regular power. As another example, a separate power connection to mains power is used. Where the RDEM component connects with the network for communications with field devices and has independent power, the RDEM function may continue while the SCADA component is unavailable. Even without communications, the current process image may be maintained with the separate power even when power to the SCADA component is off.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for real-time data and event management (RDEM) in supervisory control and data acquisition (SCADA), the system comprising:
   a plurality of sensors;
   a plurality of actuators;
   a SCADA device for industrial control using the actuators and based on input from the sensors, the SCADA device including a first processor and a first card connector; and
   a computer card having a memory and a second processor, the computer card operable to connect with the first card connector and configured to implement the RDEM for SCADA with communications with the first processor through the first card connector, the memory of the computer card storing state information of the sensors and the actuators during implementation of the RDEM for SCADA, the SCADA being by the SCADA device.

2. The system of claim 1 wherein the SCADA device comprises a personal computer.

3. The system of claim 1 wherein the SCADA device comprises a server.

4. The system of claim 1 wherein the SCADA device comprises a distributed control arrangement.

5. The system of claim 1 wherein the computer card comprises a personal computer card releasably connectable with the first card connector.

6. The system of claim 1 wherein the first card connector comprises a slot on a motherboard, the first processor mounted to the motherboard, and wherein the computer card comprises a separate board than the mother board, the separate board including contact pads for connecting with the first card connector.

7. The system of claim 1 wherein the first processor is configured to generate an RDEM gateway to communicate with the RDEM of the second processor.

8. The system of claim 1 wherein the SCADA device includes communications connectors connectable with the sensors and actuators, the first processor being configured to generate a gateway to communicate between (1) the sensors and actuators and (2) the RDEM.

9. The system of claim 1 wherein the computer card includes communications connectors connectable with the sensors and actuators, the second processor being configured to generate a gateway to communicate between (1) the sensors and actuators and (2) the RDEM.

10. The system of claim 1 wherein the first processor of the SCADA device is configured to run a configuration tool client, an user interface client, and an application client for process of an object.

11. The system of claim 1 wherein the SCADA device comprises a publicly available operating system and computing platform such that the SCADA device is changeable while maintaining the computer card and corresponding RDEM.

12. The system of claim 1 wherein the computer card is separate from an operating system and human-machine interface of the SCADA device.

13. The system of claim 1 wherein the computer card and corresponding RDEM is operable without change in hardware and software of the computer card with an upgrade of the SCADA device.

14. A method for event management in a supervisory control and data acquisition (SCADA) system, the method comprising:
   receiving, as part of a process image, a change in state of an actuator from a field device;
   checking the change against a threshold;
   storing the state, in response to receiving the change that exceeds the threshold, in a persistence store of a memory, the memory and a first processor for managing the persistence store comprising a first component; and
   running, by a second processor, a SCADA application, the SCADA application operating as a function of the state of the field device, the SCADA application accessing the state from the persistence store, the second processor comprising a second component, the first component being on a separate circuit board than the second component.

15. The method of claim 14 wherein receiving the change comprises receiving by the second processor with a field device gateway the change from a sensor or actuator, and wherein storing comprises communicating, by the second processor, the change through a management gateway implemented by the second processor to the first processor.

16. The method of claim 14 wherein receiving the change comprises receiving by the first processor with a field device gateway the change from a sensor or actuator, and wherein storing comprises routing, by the first processor, the change to the persistence store.

17. The method of claim 14 wherein running comprises requesting, by the second processor through a management gateway, the state from the memory and transmitting, by the first processor and through a slotted connector, the state to the second processor.

18. The method of claim 14 further comprising:
   powering, at least as a back-up, the first processor with a battery within the first component, the first component comprising a removable card.

19. The method of claim 14 further comprising:
   generating, by the second component, a user interface with an operating system; and
   changing the operating system, the second component, or the operating system and the second component while maintaining the first component and persistence store.

20. A method for event management in a supervisory control and data acquisition (SCADA) system, the method comprising:
   generating a user interface of the SCADA system with a computer and operating system;
   maintaining a real-time data and event management system on a computer card within and removable from the computer;
   changing the computer, the operating system, or the computer and the operating system to another computer, another operating system or the other computer and the other operating system while separately maintaining the real-time data and event management system on the computer card, the computer card operable with the computer, the operating system, the other computer, and the other operating system; and
   generating another user interface of the SCADA system with the other computer, other operating system or the other computer and operating system by the SCADA system operating, after the changing, with the maintaining of the real-time data and event management system on the same computer card.

21. The method of claim 20 wherein changing comprises removing the computer card from a first slot in the computer and installing the computer card in a second slot on the other computer.

\* \* \* \* \*